United States Patent [19]
Dowens

[11] Patent Number: 5,559,857
[45] Date of Patent: *Sep. 24, 1996

[54] SYSTEM AND METHOD FOR RECOGNIZING AND ROUTING TELEPHONE CALLS INVOLVING HEARING OR SPEECH IMPAIRED PERSONS

[75] Inventor: Jac P. Dowens, Red Bank, N.J.

[73] Assignee: Lucent Technology Inc., Murray Hill, N.J.

[ * ] Notice: The term of this patent shall not extend beyond the expiration date of Pat. No. 5,559,856.

[21] Appl. No.: 346,106

[22] Filed: Nov. 29, 1994

[51] Int. Cl.$^6$ .......................... H04M 11/00; H04M 3/42
[52] U.S. Cl. .............................. 379/52; 379/201
[58] Field of Search ................. 379/38, 52, 93, 379/96, 97, 98, 201, 210, 211, 212, 213, 214, 221

[56] References Cited

U.S. PATENT DOCUMENTS

| | | | |
|---|---|---|---|
| 4,577,066 | 3/1986 | Bimonte et al. | 379/221 |
| 5,121,421 | 6/1992 | Alheim | 379/52 |
| 5,163,081 | 11/1992 | Wycherley et al. | 379/201 |
| 5,253,285 | 10/1993 | Alheim | 379/52 |
| 5,396,536 | 3/1995 | Yudkowsky | 379/52 |

*Primary Examiner*—Jason Chan

[57] ABSTRACT

A system and method are disclosed for recognizing and routing telephone call activity involving a hearing or speech impaired person. A long distance party is called direct using standard 1+ calling. The caller is first connected to a switching network which sends a query to a Universal Subscriber Data Structure database using the caller's Automatic Number Identification (ANI) and the Dialed Long Distance Number (DLN) of the called party. The database analyzes the ANI and the DLN and responds with the caller's and the called party's profiles. If one of the parties is identified as hearing or speech impaired, the call is routed to an adjunct which connects the call to an appropriate AT&T Operator Services for the Deaf (OSD) or Telecommunications Relay Services (TRS) center, whereupon the conversation can be relayed between the hearing or speech impaired party and the voice party. During this time, the adjunct can monitor the call for a particular subscriber's feature interaction and route the call to an appropriate switch in the network based on the feature invoked by that party. A second and third database connected to the adjunct can verify feature subscriptions and perform calling card validation, respectively.

16 Claims, 12 Drawing Sheets

SYSTEM AND METHOD FOR RECOGNIZING AND ROUTING TELEPHONE CALLS INVOLVING HEARING OR SPEECH IMPAIRED PERSONS

TECHNICAL FIELD

This invention relates to systems and methods for automatically recognizing and routing telephone calls involving hearing or speech impaired persons, and for performing these functions within a switching network capable of handling local, intra-LATA, and inter-LATA calls. Two co-pending U.S. patent applications (Ser. Nos. 08/346,055 and 08/346,056) are being filed concurrently herewith.

BACKGROUND

Hearing and speech impaired customers are currently provided with telephone service through AT&T Operator Services for the Deaf (OSD) and AT&T Telecommunications Relay Service (TRS), which are only accessible by dialing an "800" number. To access either of these services, the caller must first dial the 800 number of the service center before dialing the forward number of the called party. In addition to being cumbersome, this additional operation requires that the calling party know in advance whether the called party is hearing or speech impaired. Thus, the current architecture fails to provide hearing or speech impaired persons with transparent telephone service.

An OSD or TRS center services telephone calls involving persons who are hearing or speech impaired and persons not so impaired by relaying conversations between the parties. The first leg of such a call consists of the caller dialing the 800 number of an OSD or TRS center and providing the center with the called party number. The operator at the center completes the second leg of the call by dialing the number so provided.

For inter-LATA calls, the center operator must dial through a local exchange carrier (LEC) to complete the second leg of the call. As a result, the caller is not provided with direct access to the inter-LATA network. This is because the calling party number delivered to the network will be that of the OSD or TRS center, rather than that of the caller. Thus, network features which depend upon the caller's calling party number to function are currently not available to either the caller or the called party.

"Call Complete" is one example of an inter-LATA network feature which a calling party can invoke and which depends upon the calling party number. When a called party number is busy, this feature allows a calling party to enter a series of digits (e.g. #222) and then hang-up. The network will then attempt to reach the called party every ten minutes for up to one hour. If the called party number answers, the network calls the calling party number and connects the parties. However, this feature cannot be invoked for calls which require routing to an OSD or TRS center, because in such instances the calling party number is not delivered to the inter-LATA network.

"AT&T True Ties" is another example of an inter-LATA network feature which requires that the switching network have access to the calling party number, except that this feature is one to which a called party can subscribe. This feature allows a subscriber to always pay for calls received from a telephone whose number the subscriber has previously designated. The called party may designate up to five such telephone numbers. However, for calls that require routing to an OSD or TRS center, the calling party number is not delivered to the network, and thus the network will not be able to ascertain whether that number is among those previously designated by the called party subscriber. Accordingly, the "AT&T True Ties" feature is not available to a party to such a call.

In addition, although the current architecture supports the use of calling cards by hearing or speech impaired persons, the OSD or TRS operators must currently place a separate call, using a different phone, to access (via the LEC) the card validation routines contained in the inter-LATA network. This presents a heightened opportunity for fraud since an unscrupulous operator may selectively choose not to undertake this additional step when relaying a call for a familiar calling party.

SUMMARY OF INVENTION

The aforementioned problems are solved and a technical advance is achieved in the art by eliminating the need to dial an 800 number to access the AT&T OSD or TRS centers, and by providing the parties with a direct connection to an inter-LATA switching network.

The method and architecture of the invention permit a hearing or speech impaired person to call a long distance party by using standard 1+ calling. Similarly, others may call the hearing or speech impaired person directly by using standard 1+ calling. In addition to eliminating the cumbersomeness of having to dial an 800 number followed by the telephone number of the called party, hearing or speech impaired customers are provided with transparent telephone service (i.e. callers need not know in advance whether the called party is hearing or speech impaired).

In one embodiment of the invention, the architecture recognizes when a call involves a hearing or speech impaired party by accessing a Universal Subscriber Data Structure (USDS) database in which profiles of the parties are stored.

Once a call is initiated, the caller's Automatic Number Identification (ANI) and the Dialed Long Distance Number (DLN) of the called party are sent in a query to the USDS database. If both parties are identified as hearing or speech impaired, the call is automatically connected. However, if it is determined that only one party is hearing or speech impaired, the call is routed to an appropriate OSD or TRS center where it can then be relayed by an OSD or TRS operator.

Moreover, because the present invention provides the caller with a direct access to an inter-LATA network (i.e. by providing the OSD or TRS centers with a means for establishing the forward connection without having to first dial through an LEC), it permits hearing and speech impaired customers to receive basic network calling features which until now were only available for calls between voice customers.

In addition, the proposed method and architecture includes a means for performing calling-card validation which does not require operator assistance, and thus minimizes the opportunity for fraud.

DETAILED DESCRIPTION OF PREFERRED EMBODIMENTS

Figure 1:
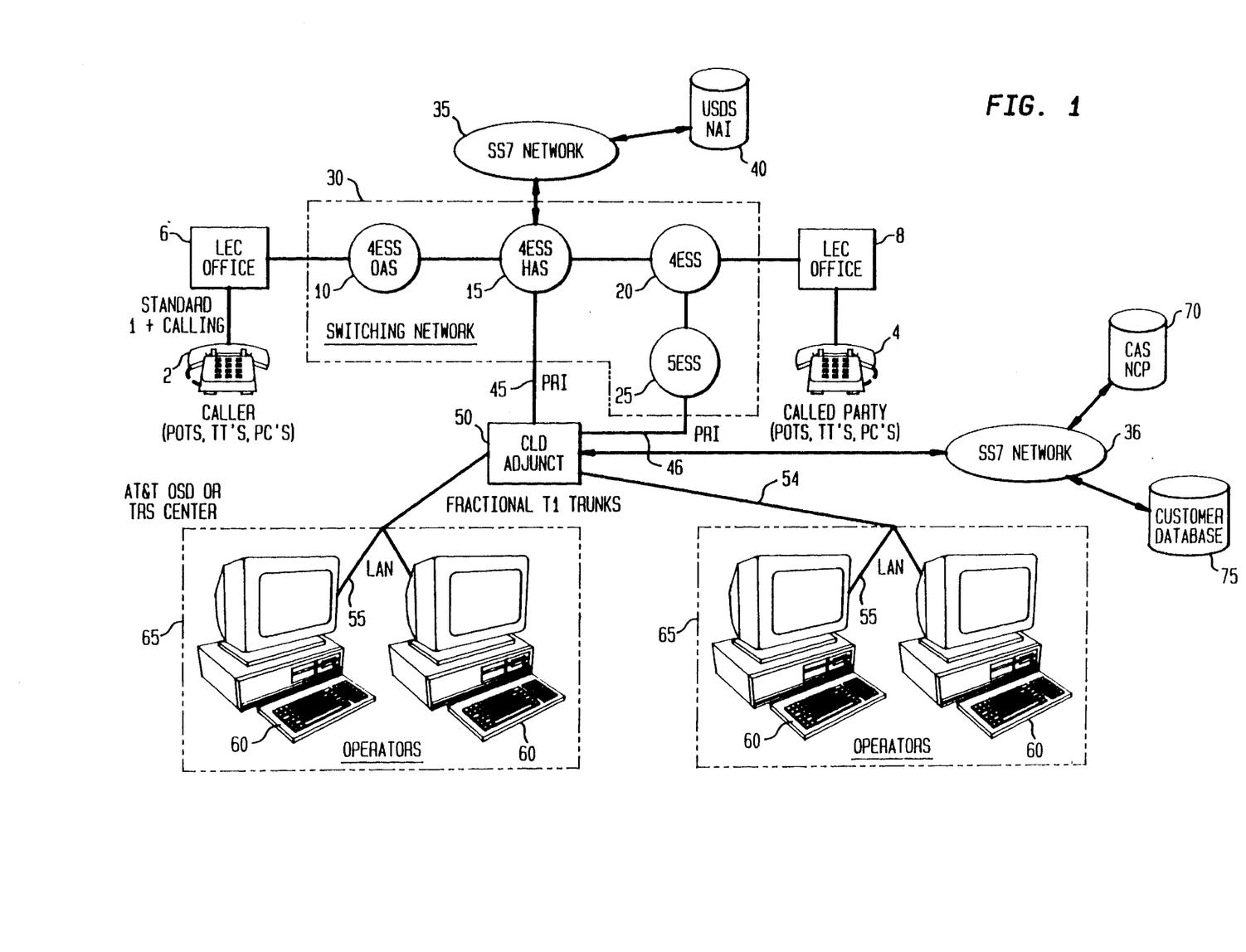
FIG. 1 is a block diagram illustrating one embodiment of the present invention in which the caller calls a long distance party direct by using standard 1+ calling (i.e. 1+NPA+NXX+XXXX).

Referring now to the drawings wherein like reference numbers refer to like parts, FIG. 1 is a block diagram of one embodiment of the invention for recognizing and routing telephone calls involving hearing or speech impaired parties. The embodiment of FIG. 1 and the embodiments which follow assume end-to-end SS7 connectivity for transmitting out-of-band calling activity (e.g. the dialed long distance number, caller and called party profiles, etc.) between the originating and terminating local exchange carrier (LEC) end offices (6, 8).

As shown in FIG. 1, the parties to a call (2, 4) access their respective LEC end offices (6, 8) by using either Plain Old Telephone Service (POTS), a telecommunications terminal (TT), or a personal computer (PC). A hearing or speech impaired party would use either a TT or a PC, whereas a voice party would typically use POTS.

In this embodiment, caller 2 places a direct call to the long distance party 4 by using standard 1+ calling. It is assumed that AT&T is the long distance carrier, although carrier selection may differ depending upon calling party presubscription or upon the existence of a contract between the carrier and the state from which the call is being placed. The call then passes through the caller's LEC (6) into a 4ESS originating AT&T switch (OAS) (10). The OAS 10 routes the call to an appropriate 4ESS hand-off AT&T switch (HAS) (15) based upon digit translations.

The HAS 15 sends the caller's ANI in a query to a Network Access Interrupt (NAI) database (40) via an SS7 network (35). If the caller is identified as one that has habitually failed to pay his phone bills, a call tear-down can be performed.

The HAS 15 also sends the ANI and the DLN in a query to a Universal Subscriber Data Structure (USDS) database (40) via the SS7 network 35 so as to acquire the caller's 2 and the called party's 4 profiles. The caller's 2 profile contains, among other things, the caller's telephone number, an indicator that the caller is hearing or speech impaired, and indicators of any features to which the caller 2 subscribes (e.g. "Call Complete"). The called party's 4 profile contains similar information.

If both the caller 2 and the called party 4 are identified as being hearing or speech impaired, the call is automatically connected. If one party is hearing or speech impaired but the other party is not, the call is routed through a Primary Rate Interface (PRI) (45) to a Customer Long Distance (CLD) adjunct (50). This is accomplished by the HAS 15 which formulates a Q.931 SETUP message and sends it to the adjunct 50 through the D-channel of the PRI (45). The adjunct 50 is an "on-the-network" platform comprising a Digital Equipment VAX computer adapted to process both voice and out-of-band signals. The message includes the DLN and the caller's 2 and the called party's 4 profiles. The adjunct 50 can then request the HAS 15 to establish a voice connection between the caller 2 and the adjunct 50 via the B-channel of the PRI (45). Note that a voice connection is required even in cases where the caller 2 is hearing or speech impaired since the TT or PC generated signals sent to the adjunct 50 are in-band signals.

For calls placed using a calling card, the adjunct 50 can obtain card validation by sending calling card information in a query to a Customer Account Service Network Control Point (CAS NCP) database (70) via an SS7 network (36).

The adjunct 50 is connected to one or more AT&T OSD or TRS centers (65) via fractional T1 trunks (54). The adjunct 50 connects to a particular center 65 based upon the ANI of the hearing or speech impaired party involved in the call. Each center 65 is staffed by operators (60) whose terminals are connected to the fractional T1 trunks 54 via the Local Area Network (LAN) 55.

The operator 60 handling the call dials the DLN received from the adjunct 50, and the adjunct 50 requests the HAS 15 to establish a voice path and a path for out-of-band signals between the called party 4 and the adjunct (50) via the B-channel and the D-channel of the PRI (45), respectively. Once the forward connection has been established, the adjunct 50 can route the calling activity over the switching network 30.

The calling activity includes the operator 60 relaying the conversation between the hearing or speech impaired and voice parties (2, 4). For example, if a hearing or speech impaired party places a call using a telecommunications terminal (TT), text typed by the TT party would be transferred over the LAN 55 for display on the operator's (60) terminal. The operator 60 would then read the text to the connected voice party. When the transaction ends, the voice party speaks his response which the operator 60 hears. The operator 60 types what is heard and the text is sent to the TT party who reads it on his terminal. This process alternates until the conversation is completed.

The adjunct 50 continuously monitors for per-call feature interaction by the parties (2, 4). Either party may invoke a feature (e.g. "Call Complete" or "AT&T True Ties") to which it subscribes.

The method used to invoke a feature depends largely upon whether the invoking party (2, 4) uses POTS, a TT, or a PC. A POTS user can use Dual-Tone Multifrequency (DTMF) signaling to invoke a feature. A TT or PC user can use some other adjunct to TT (or PC) mechanism to do the same. Alternatively, the operator 60 can invoke a feature on either party's (2, 4) behalf.

Although the profiles of the parties sent to the adjunct 50 contain feature indicators which can be used by the adjunct 50 to verify feature subscriptions, the adjunct 50 can alternatively verify subscriptions by sending ANI and DLN information in a query to a Customer Database (75) via an SS7 network 36.

Moreover, since certain features are "switch dependant," the adjunct 50 can route the calling activity through a PRI (45, 46) to either the 4ESS switch 15 or the 5ESS switch (25) based upon the feature invoked by the parties. Both the PRI 45 and the adjunct 50 provide call processing and recording capabilities for billing.

Figure 2:
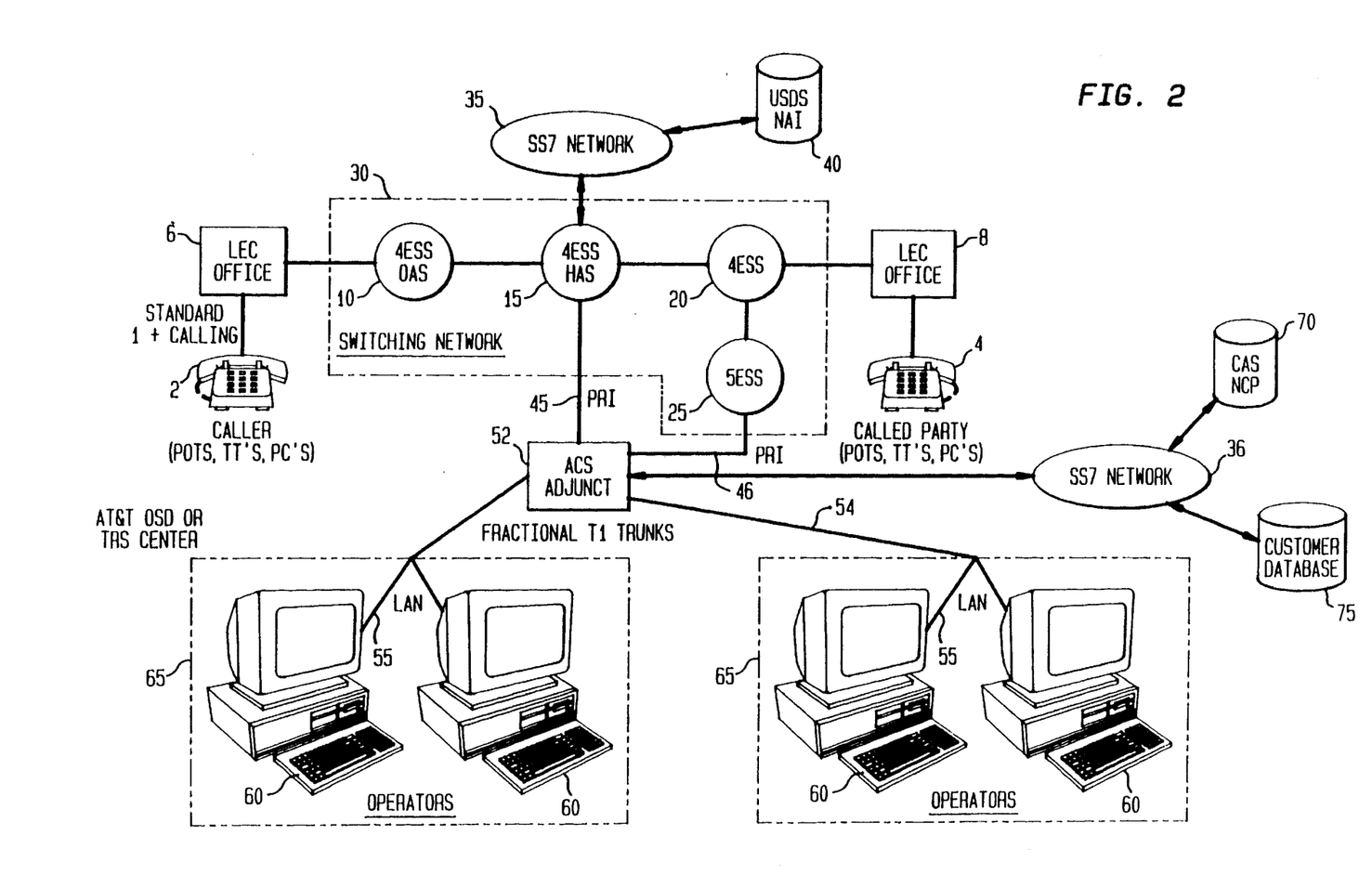
FIG. 2 is a block diagram of a slightly modified version of the embodiment shown in FIG. 1 wherein the adjunct is an Accessible Communications Services (ACS) adjunct.

FIG. 2 is a block diagram of a slightly modified embodiment of the invention. This embodiment is identical to the system disclosed in the embodiment of FIG. 1 except that here the adjunct 52 is an Accessible Communications Services (ACS) adjunct 52.

The ACS adjunct 52 is an "on-the-network" platform comprising a Definity G3 Private Branch Exchange (PBX) and a LAN connecting the OSD or TRS operator terminals to the PBX. Although typically located at each center 65, the adjunct 52 may be situated (as shown if FIG. 2) at a location remote from the center 65, thus permitting a plurality of centers 65 to share a single adjunct 52. This requires that each OSD or TRS center 65 be equipped with its own LAN 55 to connect to the adjunct 52 via the trunks 54.

Figure 3:
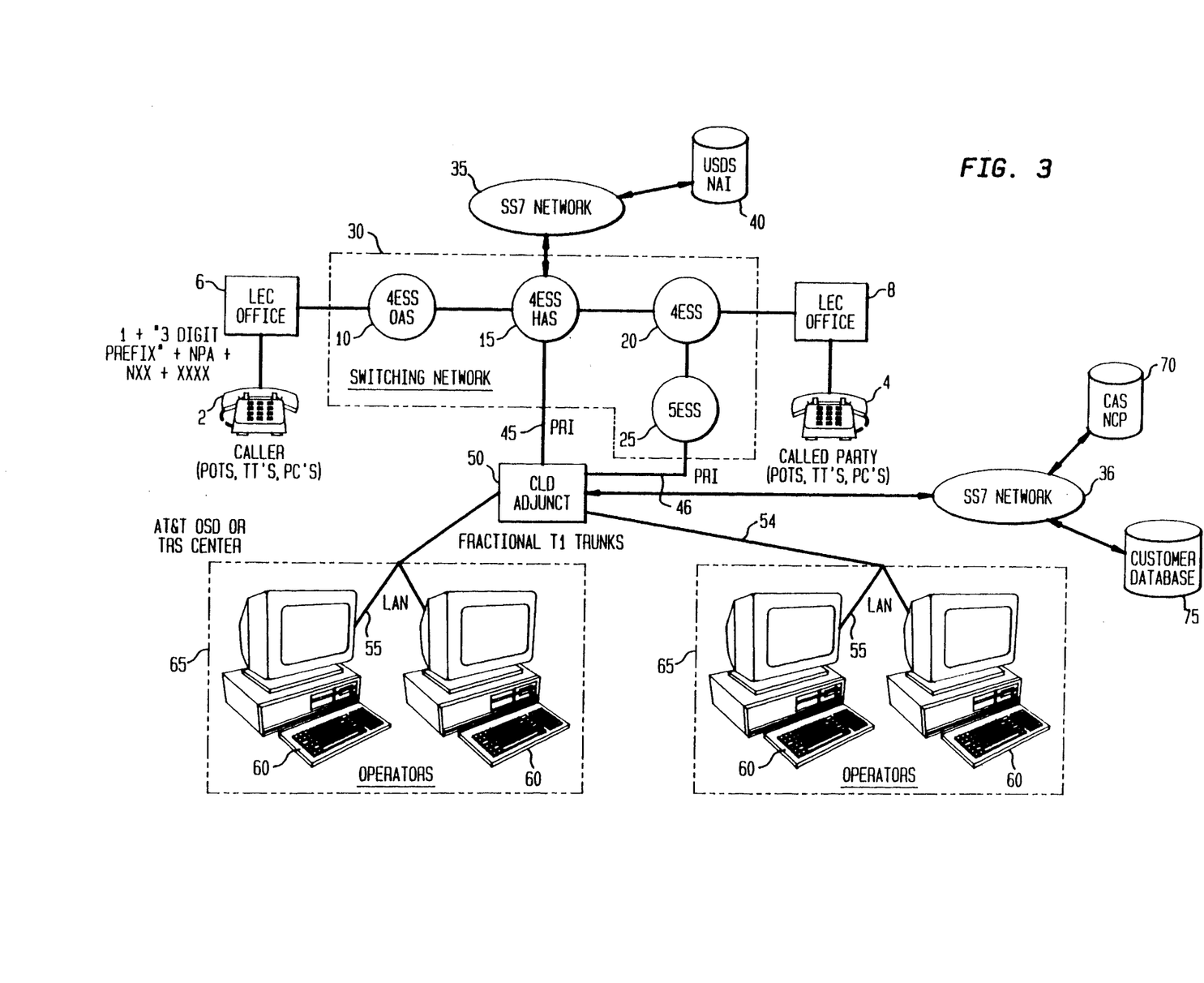
FIG. 3 is a further modified version of the embodiment shown in FIG. 1 wherein the caller dials a called party number by adding a three digit prefix to the number (e.g. 1+N11+NPA+NXX+XXXX).

FIG. 3 is yet another modified version of the invention. This embodiment is built on the same architecture as that shown in FIG. 1. However, in the embodiment of FIG. 3, the caller 2 accesses the switching network 30 by prefixing three digits to a called party number (CPN). The prefix "N11" is entered by a hearing or speech impaired person when calling a voice party. Similarly, the prefix "M11" is entered by a voice party when calling a hearing or speech impaired person. In either case, there is only a three digit difference in dialing between calls made to or by a hearing or speech impaired person and calls made between persons not so impaired.

One skilled in the art will recognize that three digit prefix dialing applies to all call types; local and intra-LATA calls, in addition to inter-LATA (i.e. long distance) calls. Therefore, this access method permits hearing or speech impaired persons to enjoy the many benefits of the architecture of the embodiment of FIG. 3 when placing or receiving calls of any type.

The caller's 2 local exchange carrier (LEC) end office 6 uses the prefix to identify the call as one in which either the calling party 2 or the called party 4 is hearing or speech impaired and thus, one which requires routing to an OSD or TRS center. The LEC 6 selects an appropriate carrier (e.g. AT&T), and routes the CPN along with the three digit prefix to the OAS 10. Of course, the LEC 6 may delete the prefix from the DLN as long as an equivalent indicator (such as "ii" digits or an SS7 parameter) is sent to the OAS 12.

For inter-LATA calls, the call flow for the embodiment of FIG. 3 is otherwise identical to that of a call placed using standard 1+ calling in the embodiment of FIG. 1. Note that the ANI and the CPN are sent in a query to the USDS database 40 even though the call has already been identified as one in need of routing to an AT&T OSD or TRS center 65. The database 40 is queried so that a complete profile of the parties (2, 4) may be obtained.

For local and intra-LATA calls, because the caller 2 and the called party 4 are connected to the same LEC (6), the call flow would be a simplified version of that of the embodiment of FIG. 1. By way of example, the call flow may merely encompass routing the call through the LEC 6, the 4ESS OAS switch 10, the 4ESS HAS switch 15, the PRI 45, the adjunct 50, and the relay center 65.

On all calls, the prefix is sent along with the CPN to the OSD or TRS center 65 and can be used to verify that "N11" calls are terminated on a modem at the center 65 and that "M11" calls are originated from a center 65 modem.

Figure 4:
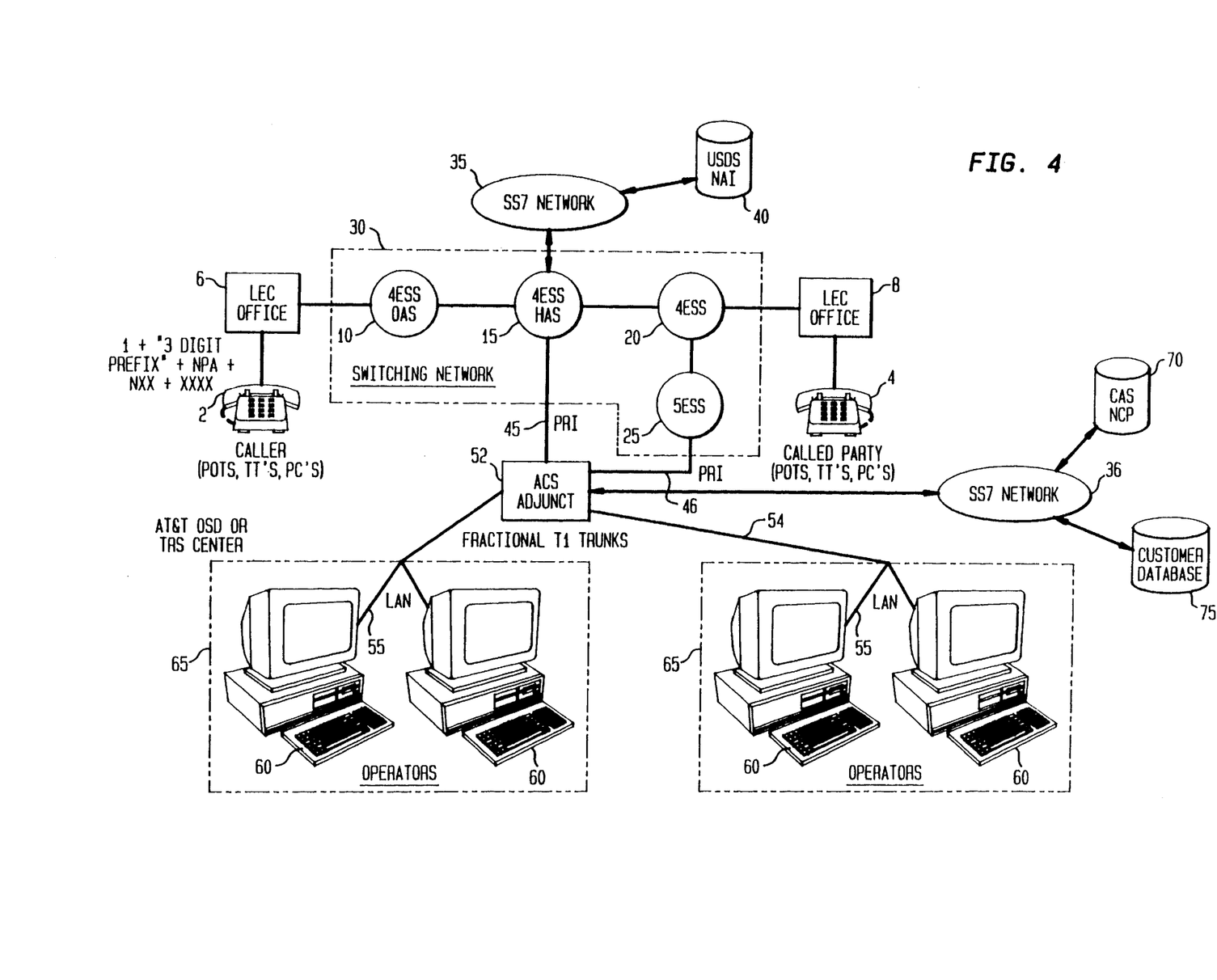
FIG. 4 is a block diagram of a slightly modified version of the embodiment shown in FIG. 3 wherein the adjunct is an ACS adjunct.

FIG. 4 is a block diagram of another embodiment of the invention. This embodiment is identical to the system disclosed in FIG. 3 except that here the adjunct 52 is an ACS adjunct.

Figure 5:
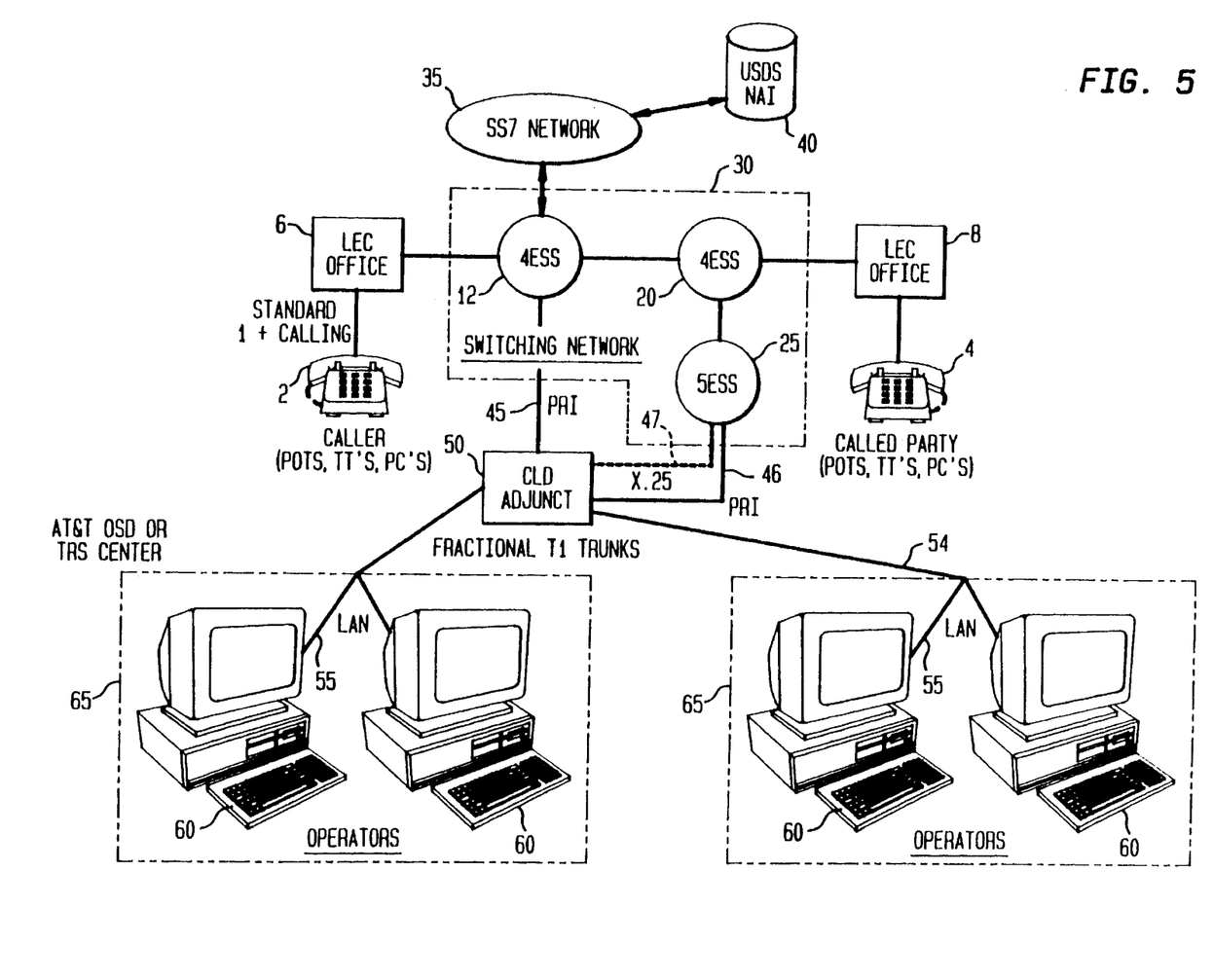
FIG. 5 is a block diagram of another embodiment of the invention in which the caller calls a long distance party direct by using standard 1+ calling.

FIG. 5 is a block diagram of yet another embodiment of the invention, which utilizes essentially the same architecture as the embodiment of FIG. 1.

In this embodiment, a call placed using standard 1+ calling passes through the caller's LEC office 6 and into a 4ESS switch (12) which, instead of performing a call handoff, sends the ANI and DLN in a query directly to the NAI and USDS databases 40 via the SS7 network 35 to obtain the parties' (2, 4) profiles.

Call flow then proceeds as in the embodiment of FIG. 1. Thus, the call can either be torn down, automatically connected, or routed to a CLD adjunct (50) via a PRI (45), based on the profiles received from the NAI and USDS databases.

The embodiment of FIG. 5 also provides a calling card validation capability. However, unlike in the embodiment of FIG. 1, an X.25 query protocol (47) between the adjunct 50 and the 5ESS switch provides this capability. Thus, the connection to the CAS NCP database 70 (as shown in FIG. 1) is not employed.

The adjunct 50 is connected to one or more AT&T OSD and TRS centers 65 via fractional T1 trunks 54. The adjunct 50 connects a call to a particular center 65 based on the ANI of the hearing or speech impaired party involved. The operator 60 at the designated center 65 establishes a forward connection via the adjunct 50, and the adjunct routes the calling activity over the switching network 30. The calling activity includes the operator 60 relaying the conversation between the hearing or speech impaired party and the voice party.

The adjunct 50 monitors for feature interaction by the parties (2, 4) and routes the calling activity through the PRI (45, 46) to either the 4ESS switch 12 or the 5ESS switch 25 accordingly. Both the adjunct 50 and the PRI (45, 46) provide call processing and recording capabilities for billing. Although not shown in FIG. 5, the adjunct 50 can also verify feature subscriptions as in the embodiment of FIG. 1.

Figure 6:
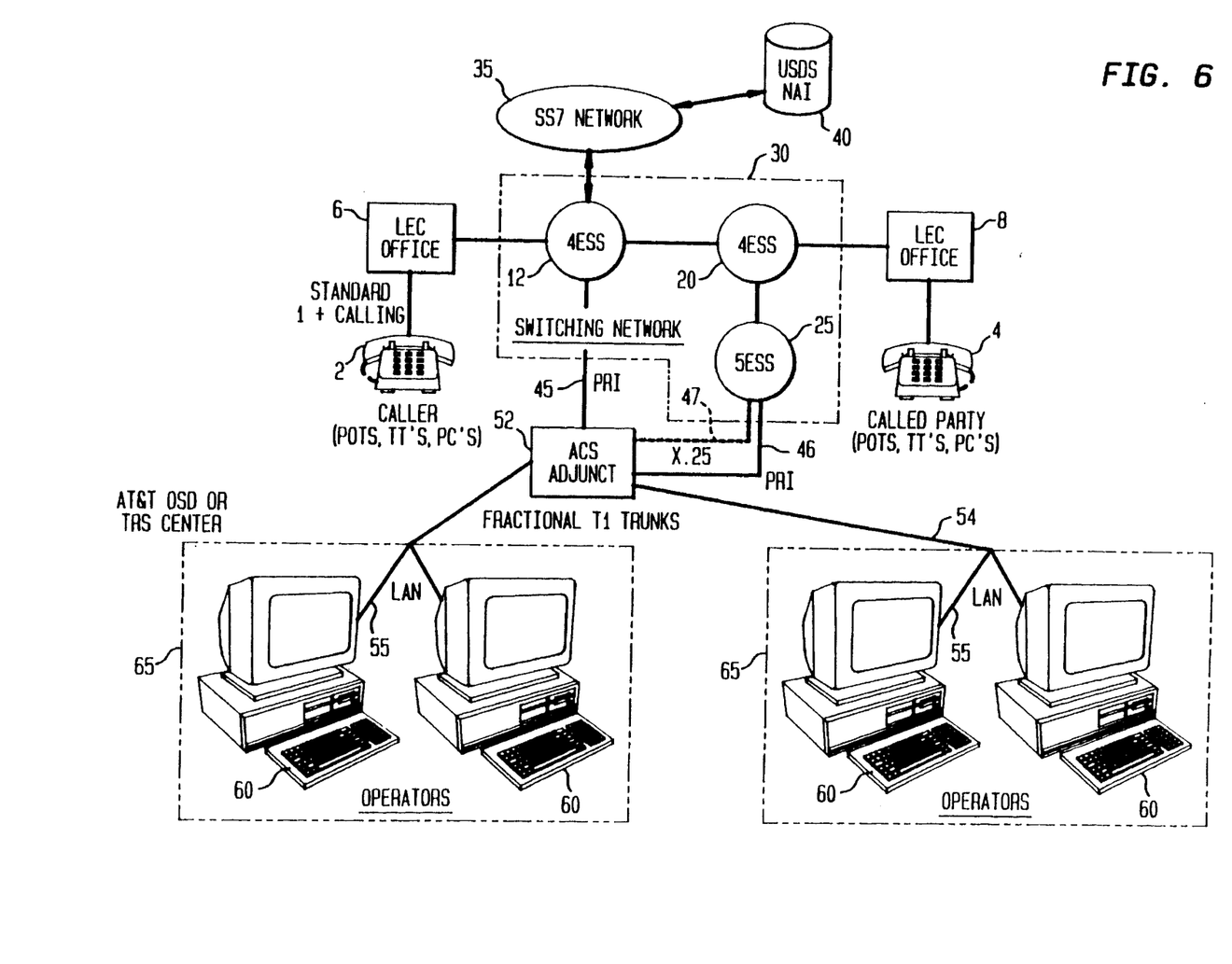
FIG. 6 is a block diagram of a slightly modified version of the embodiment shown in FIG. 5 wherein the adjunct is an ACS adjunct.

FIG. 6 is another modified version of the invention. This embodiment is identical to the embodiment of FIG. 5 except that here the adjunct 52 is an ACS adjunct.

Figure 7:
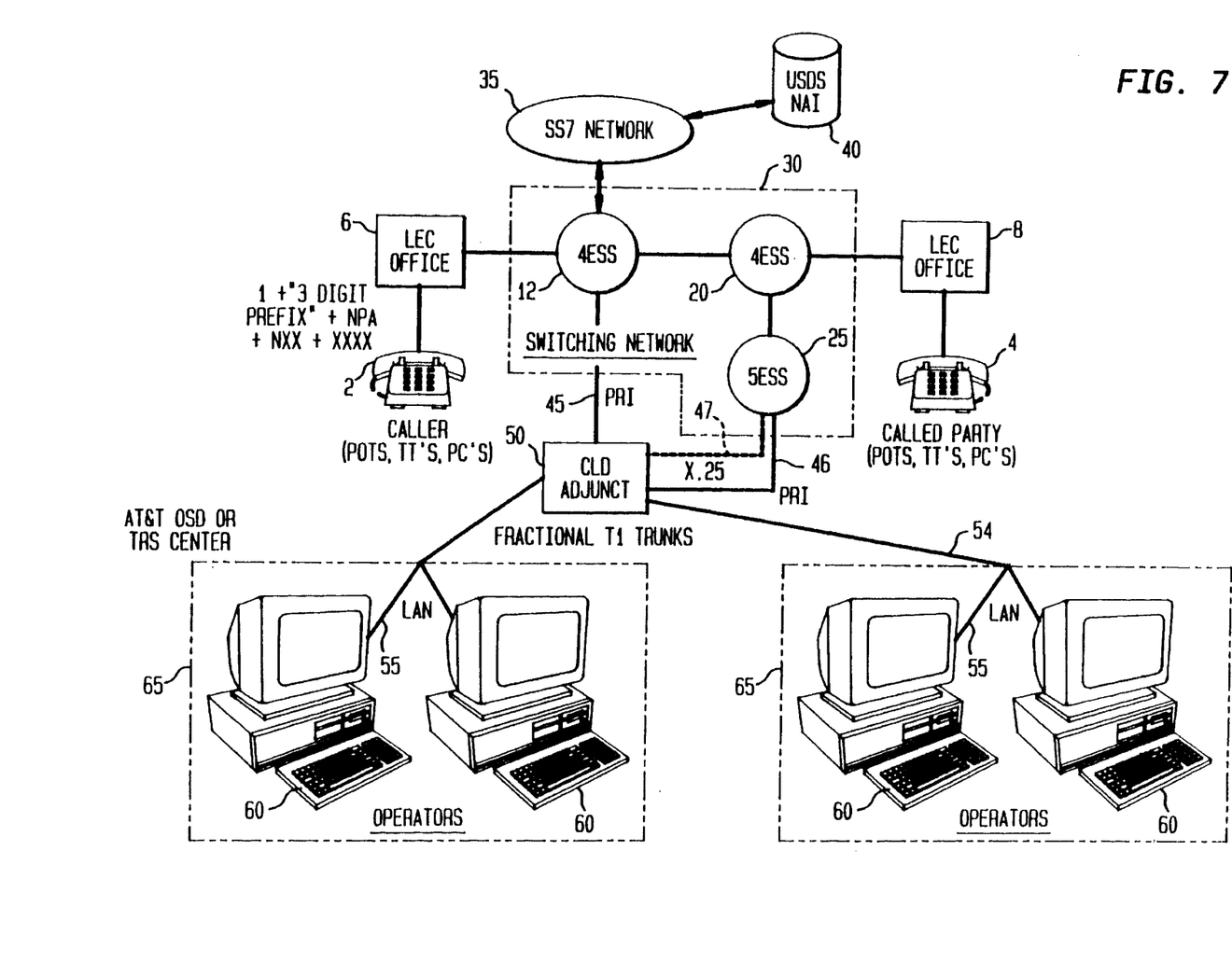
FIG. 7 is a further modified version of the embodiment shown in FIG. 5 wherein the caller dials a called party number by adding a three digit prefix to the number.

FIG. 7 is yet another modified version of the invention. This embodiment is built on the same architecture as that shown in FIG. 5. However, in this embodiment, the caller 2 accesses the switching network 30 by prefixing "N11" or "M11" to the called party number (CPN). The advantages of "3 digit prefix" dialing and the function performed by such dialing are identical to that discussed in connection with the embodiment of FIG. 3.

In this embodiment, the LEC 6 routes the CPN along with the prefix to a 4ESS switch 12 (which is comparable to the HAS 15 in FIG. 3). For inter-LATA calls, the call flow is identical to the call flow for the embodiment of FIG. 5. The USDS 40 database is queried, even though the "3 digit dialing" has identified the call as one in need of routing to an AT&T OSD or TRS center 65, so that a complete profile of the parties (2, 4) may be obtained.

For local and intra-LATA calls, the caller 2 and the called party 4 are connected to the same LEC 6 and thus, the call flow for this embodiment is a simplified version of the call flow of the embodiment of FIG. 5. The call flow may merely consist of routing the call through the LEC 6, the 4ESS switch 12, the PRI 45, the adjunct 50, and the relay center 65.

On all calls, the prefix is sent along with the CPN to the OSD or TRS center 65 and can be used to verify that "N11" calls are terminated on a modem at the center 65 and that "M11" calls are originated from a center 65 modem.

Figure 8:
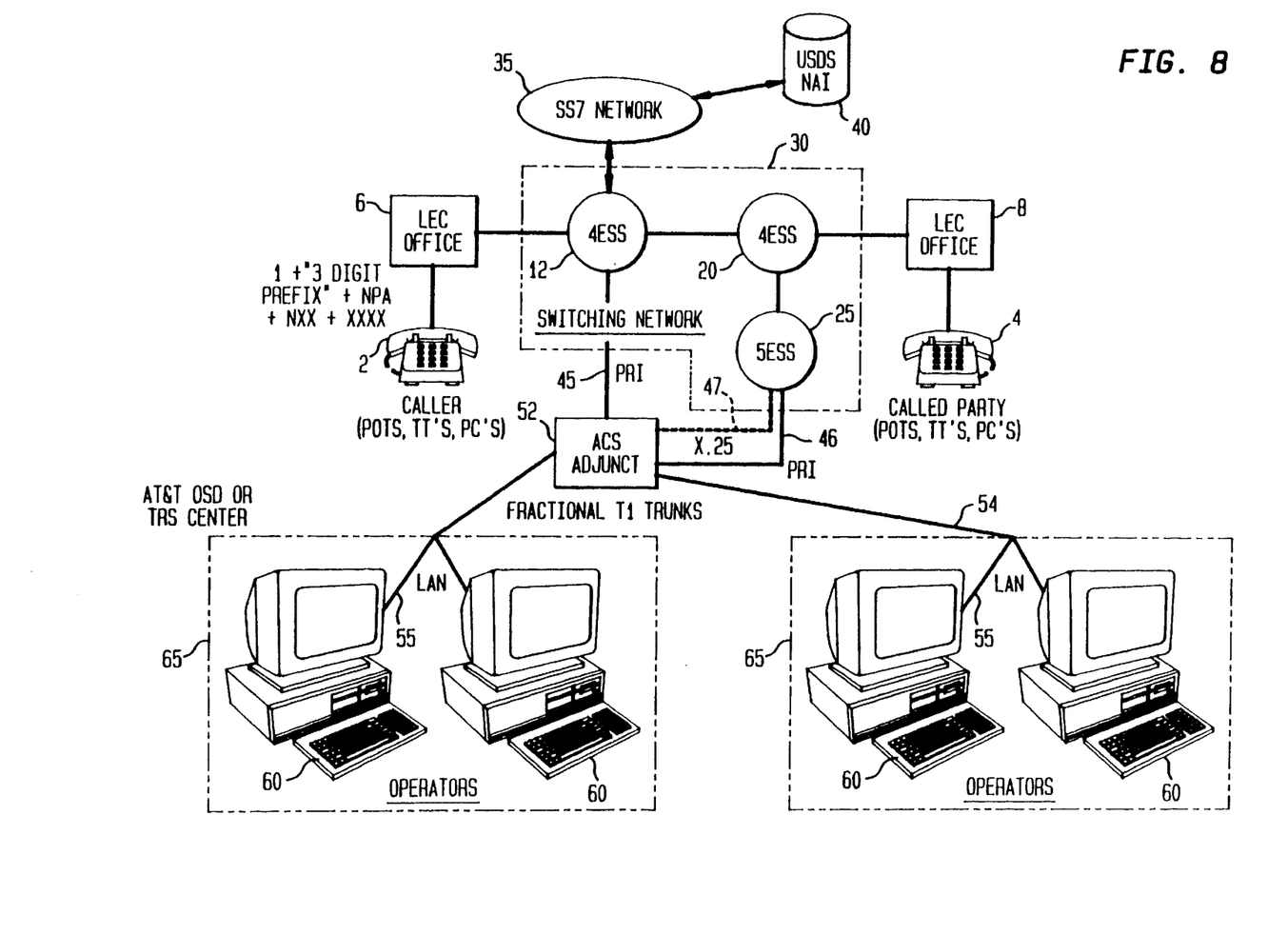
FIG. 8 is a block diagram of a slightly modified version of the embodiment shown in FIG. 7 wherein the adjunct is an ACS adjunct.

FIG. 8 is a block diagram of another modified embodiment of the invention. This embodiment is identical to the system disclosed in FIG. 7 except that here the adjunct 52 is an ACS adjunct 52.

Figure 9:
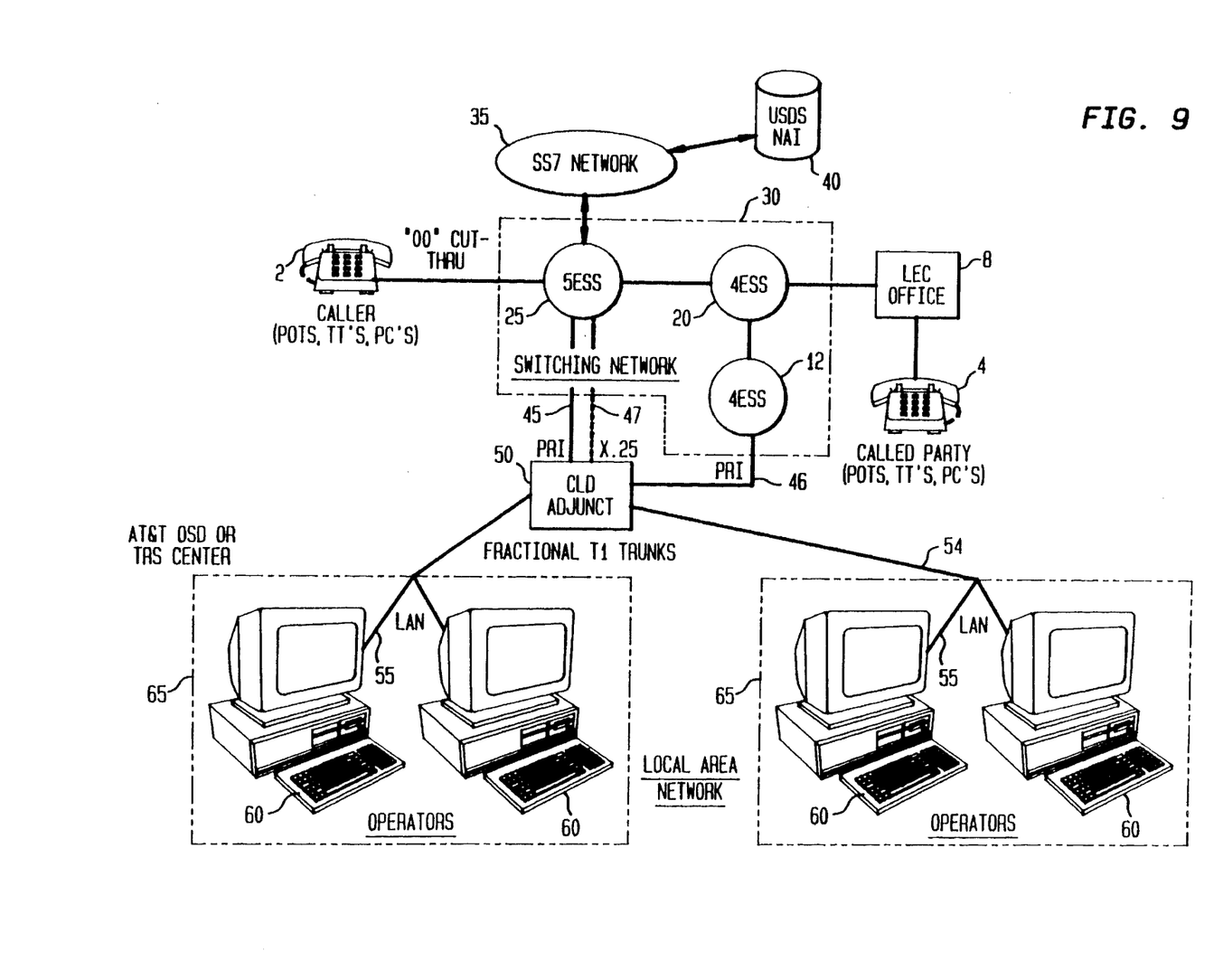
FIG. 9 is a block diagram of yet another modified version of the embodiment shown in FIG. 5 wherein the caller places the long distance call by using "Operator Cut Through".

FIG. 9 is a block diagram of another embodiment of the invention. This embodiment is built on the same architecture as the embodiment of FIG. 5, but with the following modifications.

In this embodiment, the caller 2 accesses the switching network 30 via "Operator Cut Through" by dialing "00" or "1+0+288+NPA+NXX+XXXX+a suffix", where: (1) "0+288" is an example of a long distance carrier access code which can be entered by the caller 2, and (2) the suffix identifies the call as one that requires routing to an AT&T OSD or TRS center 65. A voice party would typically dial "00" and verbally identify the call as requiring routing to a relay center, while a hearing or speech impaired person would dial the suffix extension to do the same.

Therefore, unlike in any of the foregoing embodiments, the caller does not call the long distance party direct by using standard 1+ calling, or by adding a three digit prefix to the CPN, nor is the call routed through the caller's LEC office 6.

In addition, access to the network 30 is via a 5ESS switch 25 rather than through a 4ESS switch 12, and it is the 5ESS switch 25 as opposed to the 4ESS switch 12 which sends the ANI and DLN in a query to the NAI and USDS databases 40.

The ANI and DLN are sent in a query to the USDS database 40 so that a complete profile of the parties can be obtained. Once the profiles have been obtained, and if the query to the NAI database 40 does not result in a call teardown, the 5ESS switch 25 routes the call to a CLD adjunct 50.

The function of the embodiment of FIG. 9 is otherwise identical to that of the embodiment of FIG. 5. Thus, an X.25 query protocol 47 between the adjunct 50 and a 5ESS switch 25 is used to perform calling card validation; the CLD adjunct 50 is connected to one or more AT&T OSD or TRS centers via fractional T1 trunks 54; the adjunct 50 connects the call to an appropriate center 65 based on the ANI of the hearing or speech impaired party involved in the call; the operator 60 at the center 65 establishes a forward connection via the adjunct 50; the adjunct 50 routes the conversation between the parties (2, 4) (as relayed by the operator 60) over the switching network 30; the adjunct 50 monitors for feature interaction by the parties (2, 4) and routing is through the PRI (45, 46) to the appropriate 5ESS switch 25 or 4ESS switch 12 based on the feature invoked; call processing and recording are performed by both the adjunct 50 and the PRI (45, 46).

Although not shown in FIG. 9, the adjunct 50 can verify feature subscriptions as in the embodiment of FIG. 1.

Figure 10:
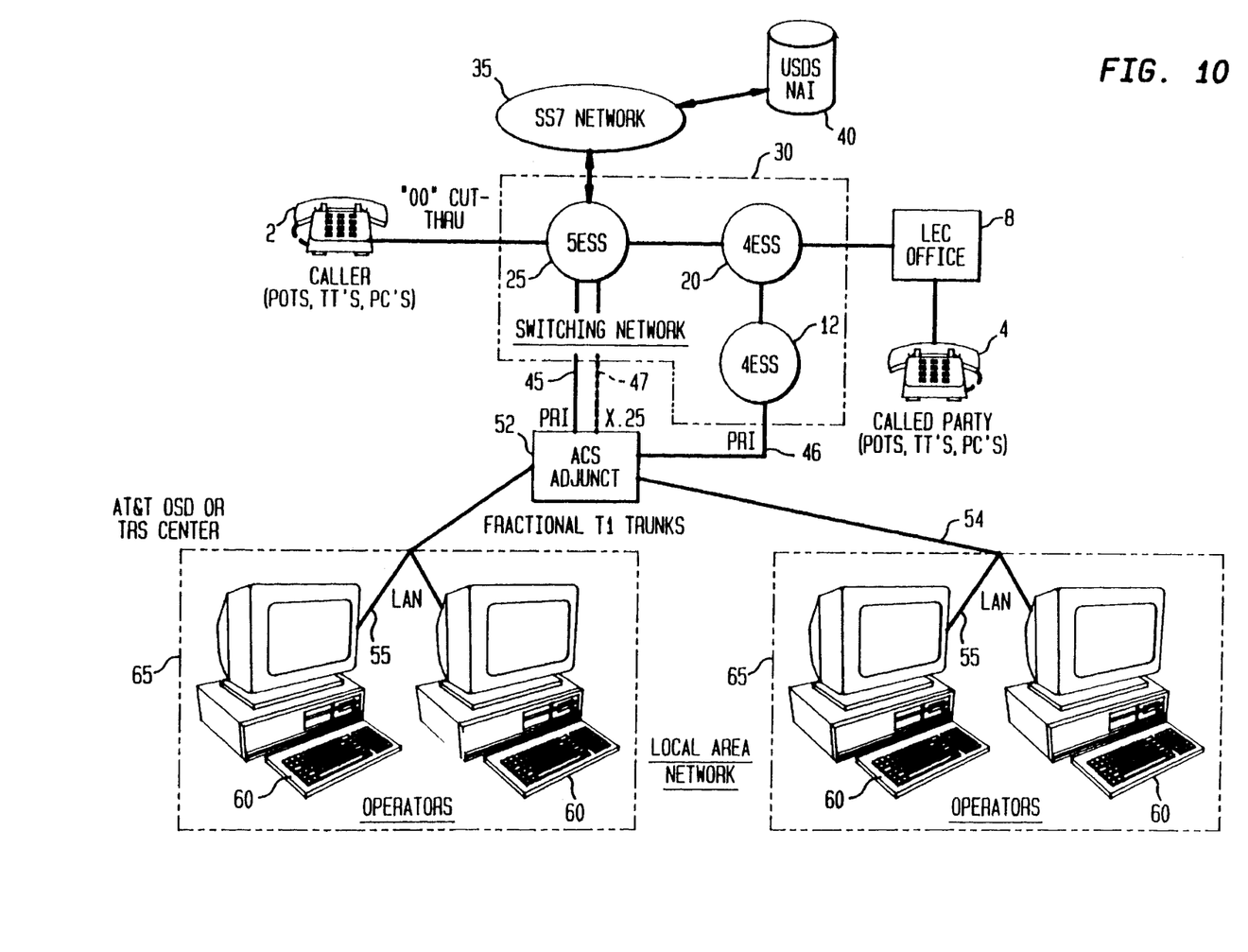
FIG. 10 is a block diagram of a slightly modified version of the embodiment shown in FIG. 9 wherein the adjunct is an ACS Adjunct.

FIG. 10 is a block diagram of yet another modified embodiment of the invention. This embodiment is identical to the embodiment of FIG. 9 except that here the adjunct 52 is an ACS adjunct 52.

Figure 11:
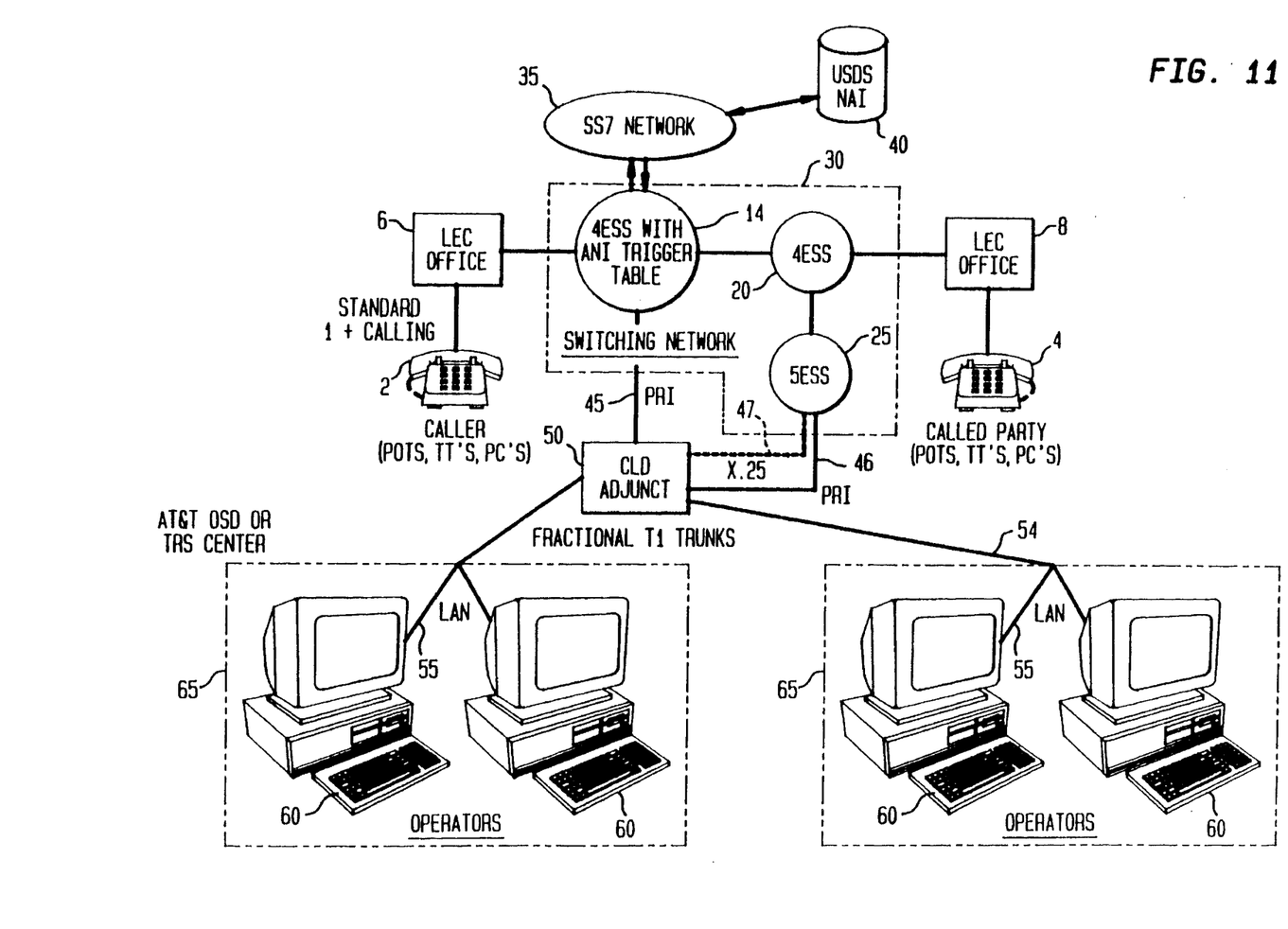
FIG. 11 is a block diagram of another modified version of the embodiment shown in FIG. 5 wherein the decision to route the call to the CLD adjunct is based on the existence of caller and called party information stored in an ANI trigger table located in the 4ESS switch.

FIG. 11 is a block diagram of another modified version of the embodiment in FIG. 5. For this embodiment, the decision to send the call to the CLD adjunct 50 is based on the existence of the ANI or DLN in an ANI Trigger Table; the Trigger Table is located in the 4ESS switch 14 connected to the caller's LEC office 6. The USDS database 40 is nevertheless queried so that a complete profile of the parties may be obtained.

The architecture and call flow of this embodiment are otherwise identical to the architecture and call flow of the embodiment of FIG. 5.

Figure 12:
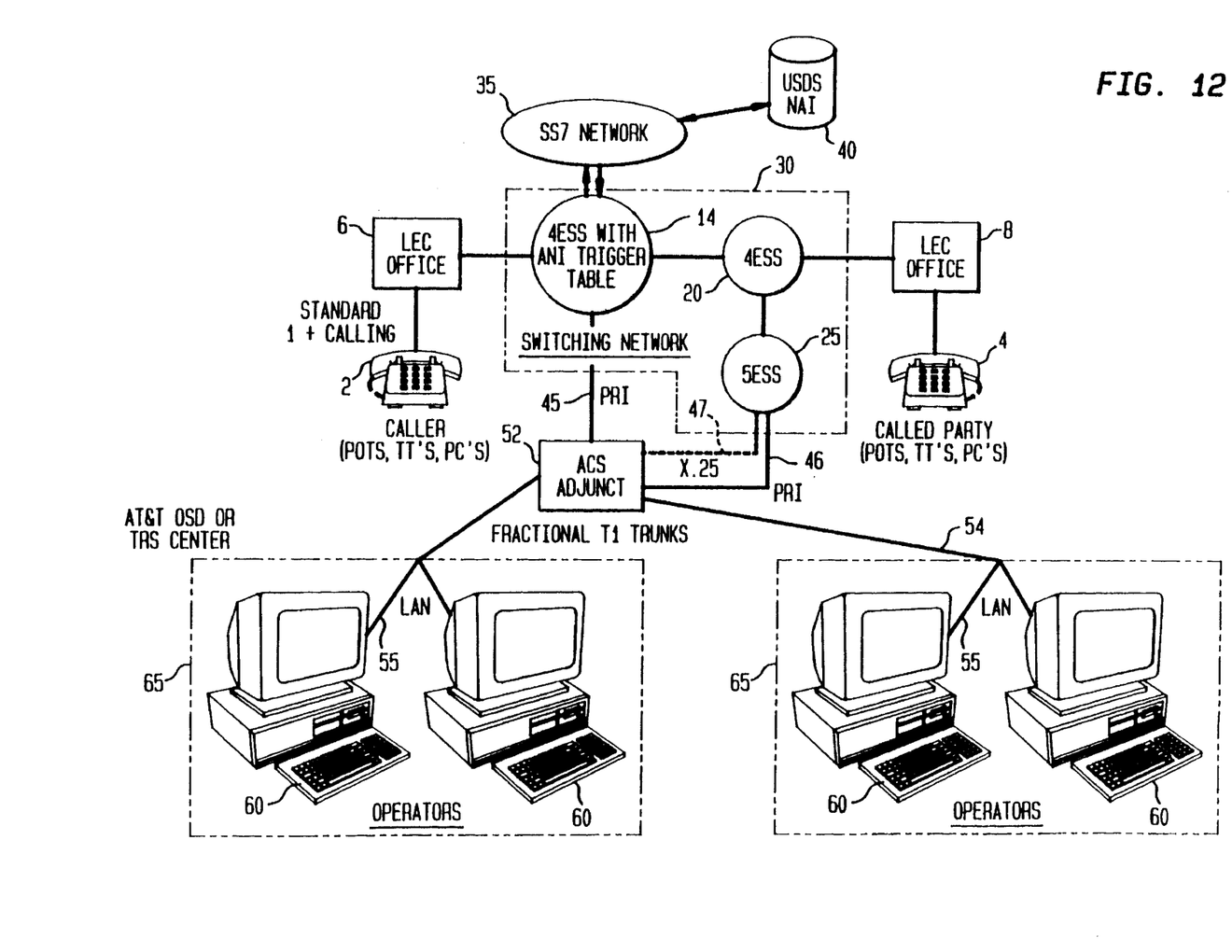
FIG. 12 is a block diagram of a slightly modified version of the embodiment shown in FIG. 11 wherein the adjunct is an ACS Adjunct.

FIG. 12 is a block diagram of a modified version of the embodiment of FIG. 11. Here the adjunct 52 is an ACS adjunct 52.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

I claim:

1. A system for recognizing and routing telephone call activity involving a hearing or speech impaired person, comprising:

a switching network having one or more switches for routing telephone call activity, said telephone call activity having been initiated by a caller using 1+ calling;

the switching network coupled to an originating telephone call location and a destination telephone call location;

a first database means coupled to the switching network for analyzing origination and destination information associated with the telephone call activity so as to retrieve a profile of the parties involved in said telephone call activity;

a signaling network coupling the switching network with the first database means for transmitting the origination and destination information from said switching network to said first database means, and for transmitting said profile from said database means to said switching network;

an adjunct coupled to the switching network for controlling routing of the telephone call activity in the system;

a first interface for routing the calling activity from the switching network to the adjunct in response to said profile indicating that one of the parties involved in said telephone call activity is hearing or speech impaired; and a relay center operably connected to the adjunct for servicing the telephone call activity when a hearing or speech impaired person is involved.

2. The system of claim 1 wherein the adjunct is either a Customer Long Distance (CLD) adjunct or an Accessible Communications Services (ACS) adjunct and the telephone call activity routed to said adjunct includes said profile.

3. The system of claim 2 wherein the switching network further comprises:

an originating switch coupled to a hand-off switch;

said hand-off switch coupled to the first database means and the adjunct via the signaling network and the first interface respectively.

4. The system of claim 2 wherein said first database means includes means for analyzing origination information associated with said telephone call activity to determine whether a call tear down should be performed because of caller account delinquency.

5. The system of claim 2 further comprising:

a second interface for routing telephone call activity from the adjunct to the switching network, wherein the adjunct routes the telephone call activity to switches in the switching network via the first or the second interface based on a telephone feature to which the caller or a called party has subscribed.

6. The system of claim 5 wherein the adjunct is coupled to a second database means via a signaling network for verifying whether the caller or the called party has subscribed to said telephone feature.

7. The system of claim 2 wherein the adjunct is coupled to a third database means via a signaling network for performing calling card validation.

8. The system of claim 2 wherein an X.25 query protocol between the adjunct and the switching network is used to perform calling card validation.

9. A method for recognizing and routing a telephone call involving a hearing or speech impaired person, comprising the steps of:

routing a telephone call, initiated by a caller using 1+ calling, from an originating telephone call location over a switching network to a destination telephone call location;

transmitting origination information and destination information from said switching network to a first database means;

the first database means analyzing the origination and the destination information associated with the telephone call so as to retrieve a profile of the parties involved in said telephone call;

transmitting said profile from said first database means to said switching network; and routing the telephone call from the switching network to an adjunct via a first interface when said profile indicates that one of the parties involved in said telephone call is hearing or speech impaired; and the adjunct routing the telephone call to a center which relays conversations between hearing or speech impaired persons and persons whose hearing or speech is not impaired.

10. The method of claim 9 wherein the adjunct is either a Customer Long Distance (CLD) adjunct or an Accessible Communications Services (ACS) adjunct.

11. The method of claim 10 wherein the switching network further comprises:

an originating switch coupled to a hand-off switch;

the hand-off switch coupled to the first database means and the adjunct via a signaling network and the first interface respectively.

12. The method of claim 10 further comprising the step of:

the first database means analyzing the origination information associated with the telephone call to determine whether a call tear-down should be performed because of caller account delinquency.

13. The method of claim 10 further comprising the step of:

the adjunct routing the telephone call from said center to switches in the switching network via the first interface or a second interface based on a telephone feature to which the caller or a called party has subscribed.

14. The method of claim 13 further comprising the step of:

verifying via a second database means coupled to said adjunct whether the caller or the called party has subscribed to said feature.

15. The method of claim 10 wherein:

a third database means is coupled to the adjunct via a signaling network; and further comprising the step of:

said third database means validating the caller's calling card information.

16. The method of claim 10 further comprising the step of:

validating calling card information via an X.25 query protocol between the adjunct and the switching network.

\* \* \* \* \*